2 Sheets--Sheet 1.

L. W. POND & F. McDONOUGH.
Head-Blocks for Saw-Mills.

No. 156,857. Patented Nov. 17, 1874.

Witnesses:

Inventor:
Levi W. Pond
Frank McDonough

L. W. POND & F. McDONOUGH.
Head-Blocks for Saw-Mills.

No. 156,857.

2 Sheets--Sheet 2.

Patented Nov. 17, 1874.

Witnesses:

Inventor:
Levi W. Pond
Frank McDonough

UNITED STATES PATENT OFFICE.

LEVI W. POND AND FRANK McDONOUGH, OF EAU CLAIRE, WIS., ASSIGNORS OF ONE-THIRD THEIR RIGHT TO EAU CLAIRE LUMBER COMPANY.

IMPROVEMENT IN HEAD-BLOCKS FOR SAW-MILLS.

Specification forming part of Letters Patent No. 156,857, dated November 17, 1874; application filed June 15, 1874.

*To all whom it may concern:*

Be it known that we, LEVI W. POND and FRANK McDONOUGH, of Eau Claire, in the county of Eau Claire and State of Wisconsin, have invented new and useful Improvements in Head-Block for Saw-Mills, of which the following is a full description, reference being had to the accompanying drawings, in which—

Figure 1:
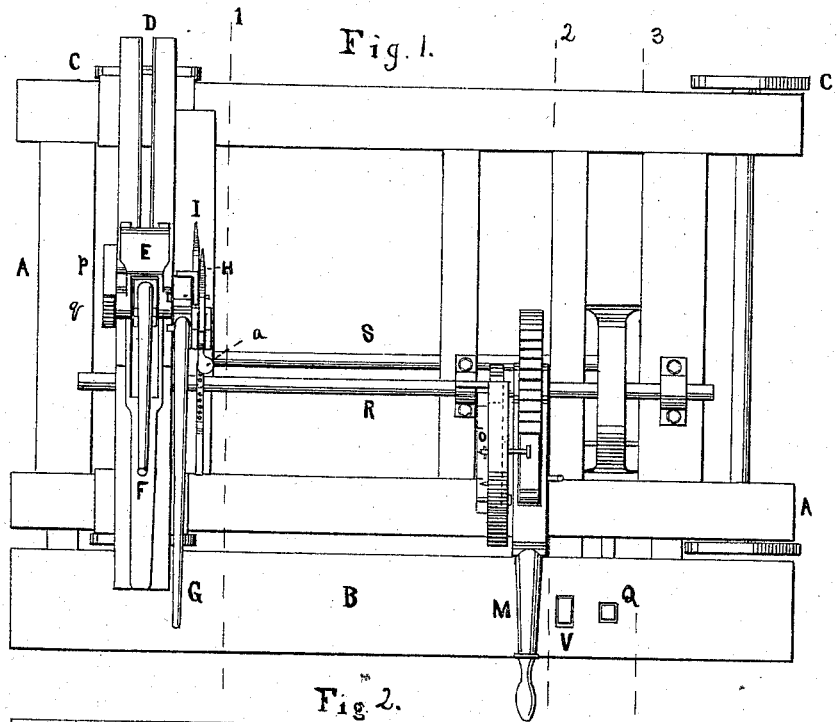
Figure 2:
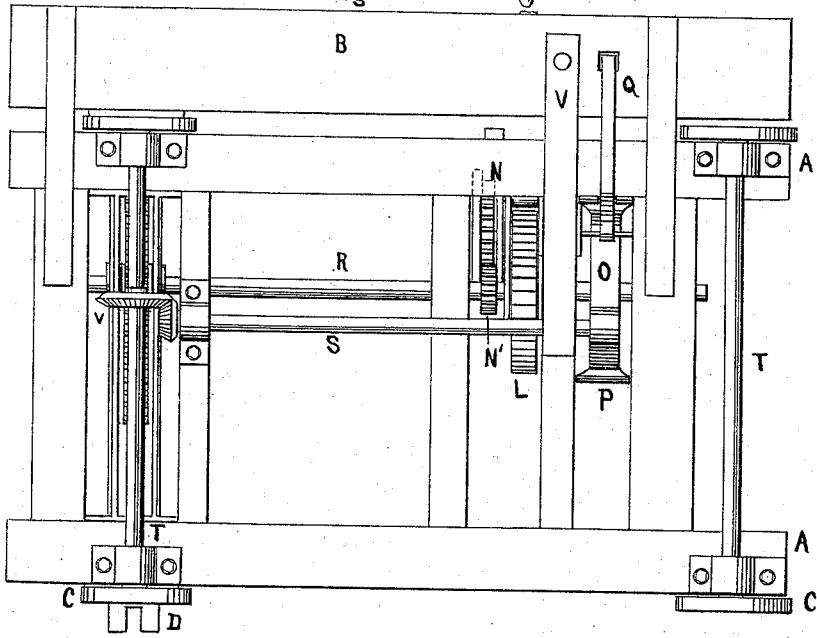
Figure 3:
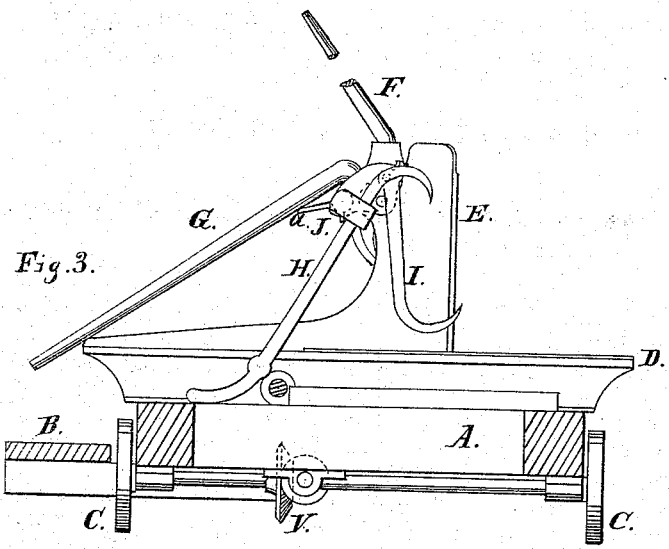
Figure 4:
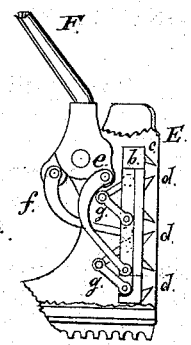
Figure 5:
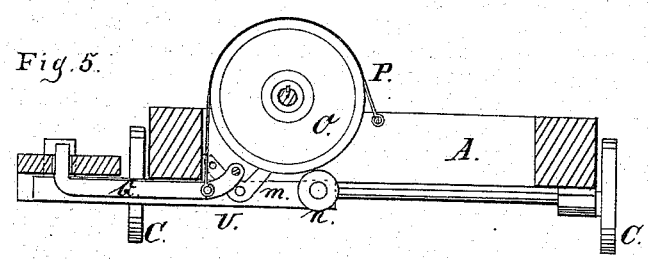
Figure 7:
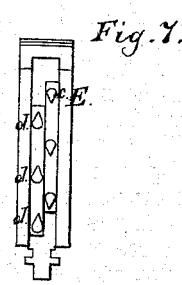
Figure 6:
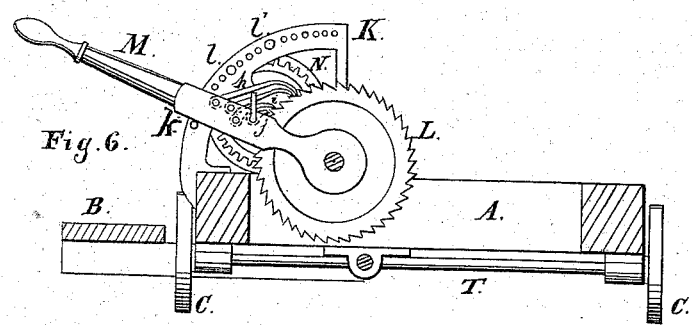

Figure 1 is a top or plan view; Fig. 2, a reverse or bottom view; Fig. 3, a cross-section on line 1 of Fig. 1; Fig. 4, a view of the standard, with one side removed to show the levers and dogs; Fig. 5, a cross-section on line 3 of Fig. 1; Fig. 6, a cross-section on line 2 of Fig. 1; and Fig. 7, a face view of the standard.

The object of our invention is to improve the operation of the carriage in its attachments; in the devices for canting or turning the log, and the devices for holding the log in place; and its nature consists in the improvements of the several devices and combinations hereinafter described and claimed.

In the drawings, A represents the frame; B, the foot-board; C, the wheels; D, the head-block; E, the standard or knees; F, the lever for operating the dogs; G, the lever for operating the canting devices; H, the upper cant-hook; I, the lower cant-hook; J, the arm or sleeve on the head of the lever G, through which the cant-hook H slides; K, the segment, provided with holes for limiting the movement of the set-lever; L, the ratchet-wheel; M, the pawl or set-lever; N N', the gear-wheels for operating the dial-wheel; O, the friction or brake wheel; P, the brake-band; Q, the brake-lever; R, the head-block or set-shaft; S, the shaft for receding the standards; T, the axles; U, the foot-lever for returning the standards; V, the miter-wheels for receding the standards; $a$, the spur-dog for holding the sliding cant-hook in any position in which it may be placed; $b\ c$, the dogs; $d$, the dog-teeth; $e$, the link for operating the dog $b$; $f$, the link for operating the dog $c$; $g$, the links or braces by means of which the dogs are advanced or withdrawn; $h\ i\ j$, the pawls on the set-lever M; $k$, the stop-pin for the lever M; $l$, the holes in the segment K; $l'$, the pin for limiting the movement of the lever M; $m$, the pivot for the lever U; $n$, the friction-wheel on the shaft S for receding the standard.

The frame A is made and mounted on wheels in the usual manner, and provided with an ordinary foot-board, B, and is made to travel backward and forward by any suitable or well-known means.

The head-block D is made in the usual manner, and provided with an opening or passage for a tongue or projection on the standard, which tongue is provided with cogs or a rack for moving it back and forth.

The standard E is made with a sufficient opening through it for the double dogs $b\ c$. On the back of the standard the lever F is pivoted, and its head passes into the opening in the standard, and is provided on one side with a link or brace, $e$, for lifting the dog $b$, and on the opposite side with a link or brace, $f$, for depressing the dog $c$, the teeth $d$ of the dogs being inclined in opposite directions. The links or braces $g$ are pivoted at their outer ends to the dogs $b\ c$, and at their rear ends to the sides of the standard E or to a cross-bolt, so that the dogs will advance when the lever F is depressed, and recede when it is elevated.

At the side of the standard E is attached a canting-lever, G, at the end of which the hook-bar I is pivoted, and in the rear of its journal a pivoted arm or sleeve, J, is attached, through which the upper canting-hook, H, passes. This upper hook H slides through the sleeve J, so as to fit any sized log, and when in position the spur-dog $a$ drops into one of the series of holes (shown in Fig. 1) on the back of said sliding hook, and holds it in the position in which it is placed, or in which it falls. When the lever G is depressed the hook I takes under the log and the hook H over it, and turns the log toward the face of the standard. The hook H will also prevent the log from turning whenever it is lifted for the purpose of getting barks or chips from under it, or whenever it is lifted for any purpose; and, if desired, it may be used to assist the dogs in holding the log when in position, and when depressed it will be held in position by a pawl and ratchet, $p\ q$, on the opposite end of its journal. (Shown in Fig. 1.)

On the set-shaft R, which moves the standard, at a suitable distance therefrom, is placed a ratchet-wheel, L, and forked lever M, to which the pawls h i j are attached. The pawl j is provided with an arm, as shown in Fig. 6. By depressing this arm it acts as a cam or eccentric to throw all of the pawls out of connection, which is done when the standard is to be receded. When the log is to be advanced the pawls are thrown in gear and the lever M elevated till it comes in contact with the pin l', inserted in some one of the holes l of the segment K, which holes are adjusted for different thicknesses of boards. These thicknesses are further shown by an indicator or dial-wheel, o, at the back of the segment K, as shown in Fig. 1. The set-shaft R is provided, under the standard, with a pinion to engage with the rack of the standard.

In order to stop and hold the standard when turning the log an additional wheel, O, is provided. On this wheel is placed a brake-band, P, which is attached to the carriage frame at the inner end, and at the outer end to a foot-lever, which is bent or projects up through the foot-board, as shown at Fig. 5. By this arrangement a heavy pressure can be applied, and the standard stopped at the desired point and held in position.

To recede the standard, the foot is placed upon the lever U, which also projects through the foot-board, and, by means of the friction-wheel n, the shaft R is made to revolve and recede the standard.

One or more additional head-blocks and standards will be applied to the carriage in use, but they need not be provided with the canting apparatus; and when applied the heads of the dog-levers may be attached to a shaft running the entire length of the carriage, so as to operate them all simultaneously by a single lever.

We are aware that standards with double dogs having interlocking teeth have been heretofore made, and which were thrown out or withdrawn by pins and inclined slots; but by this arrangement a large part of the movement is lost before the dog-teeth come in contact with the log.

By our improvement, in hanging them on the short bars g, moving in the arc of a circle, they are quickly thrown out, and after the teeth are out the movement is in line with the log, so that we obtain a better hold without any tendency to crowd the log off, and obtain longer sweep, which is especially advantageous for round logs.

What we claim as new is as follows:

1. The combination of the gear-wheels V, operated from a carriage-axle, with the shaft S, friction-wheel n, wheel O, and lever U, for receding the standards, substantially as described.

2. The lever G, in combination with the pivoted hook I, sleeve J, and sliding hook H, substantially as and for the purposes described.

3. The lever G, pivoted hook I, sleeve J, and sliding hook H, in combination with spur-dog a, pawl and ratchet p q, and standard E, as and for the purpose herein set forth.

LEVI W. POND.

FRANK McDONOUGH.

Witnesses:
FITCH GILBERT,
A. D. AINSWORTH.